M. O. NICHOLS.
Musical Reed Instrument.

No. 229,837. Patented July 13, 1880.

6 Sheets—Sheet 2.

M. O. NICHOLS.
Musical Reed Instrument.

No. 229,837. Patented July 13, 1880.

Witnesses:
P. C. Dietrich
Geo. D. Seymour

Inventor:
Moses O. Nichols
By H. A. Seymour
Atty.

6 Sheets—Sheet 3.

M. O. NICHOLS.
Musical Reed Instrument.

No. 229,837. Patented July 13, 1880.

Witnesses:
P. C. Dietrich
Geo. D. Seymour

Inventor:
Moses O. Nichols
By H. A. Seymour, Atty.

6 Sheets—Sheet 4.
M. O. NICHOLS.
Musical Reed Instrument.
No. 229,837. Patented July 13, 1880.
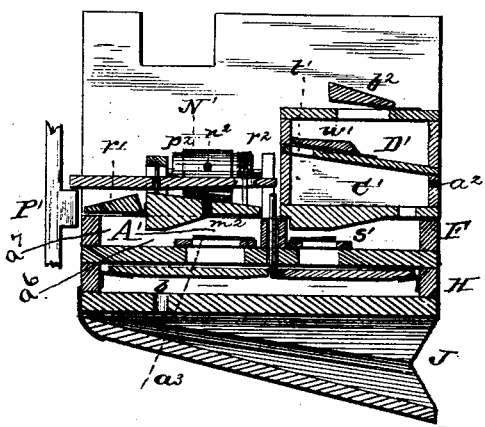
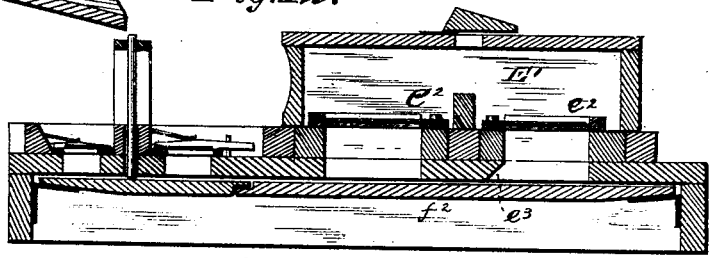
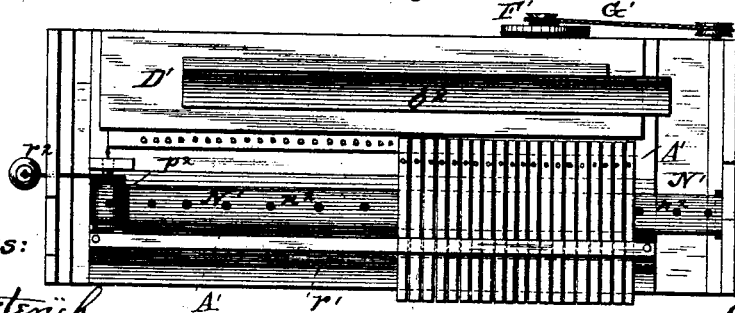
Witnesses: Inventor.

6 Sheets—Sheet 5.

M. O. NICHOLS.
Musical Reed Instrument.

No. 229,837. Patented July 13, 1880.

Witnesses:
P. C. Dietrich.
Geo. D. Seymour

Inventor.
Moses O. Nichols.
By N. A. Seymour, Atty.

N. PETERS, PHOTO-LITHOGRAPHER, WASHINGTON, D.C.

M. O. NICHOLS.
Musical Reed Instrument.

No. 229,837.  Patented July 13, 1880.

UNITED STATES PATENT OFFICE.

MOSES O. NICHOLS, OF CLYDE, ASSIGNOR OF ONE-HALF OF HIS RIGHT TO ELLIS L. MUNDY AND GEORGE BUTT, OF NORWALK, OHIO.

MUSICAL REED-INSTRUMENT.

SPECIFICATION forming part of Letters Patent No. 229,837, dated July 13, 1880.

Application filed February 13, 1880.

*To all whom it may concern:*

Be it known that I, MOSES O. NICHOLS, of Clyde, in the county of Sandusky and State of Ohio, have invented certain new and useful Improvements in Musical Instruments; and I do hereby declare the following to be a full, clear, and exact description of the invention, such as will enable others skilled in the art to which it pertains to make and use it, reference being had to the accompanying drawings, which form part of this specification.

My invention relates to a new and improved musical reed-instrument, which I call a "dynamicon."

The object of the invention is to provide a full range of the widest varieties of reed tones, affording a degree of power and depth which has not heretofore been obtained; also, to produce very soft sounds, which float away and die in a seeming distance.

The instrument is adapted to produce true imitations of several orchestral instruments, among which are the bugle, clarionet, flute, and cornet, the different tones thereby obtained not satiating the ear, but, on the contrary, affording a delightful variety of the most musical qualities of reed sounds. The general form of the reed-organ is preserved, and the bellows are arranged in the same order as in the ordinary reed-organ.

Figure 1:
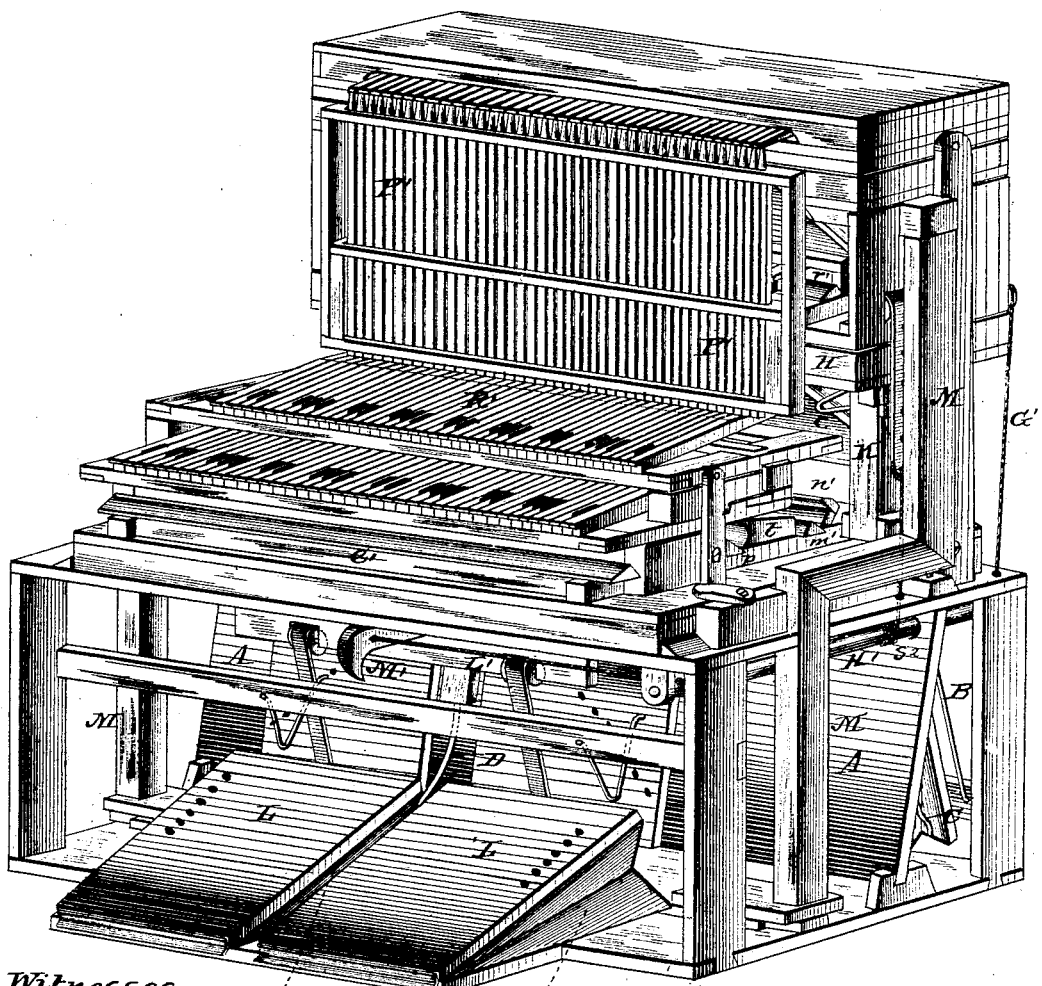
Figure 2:
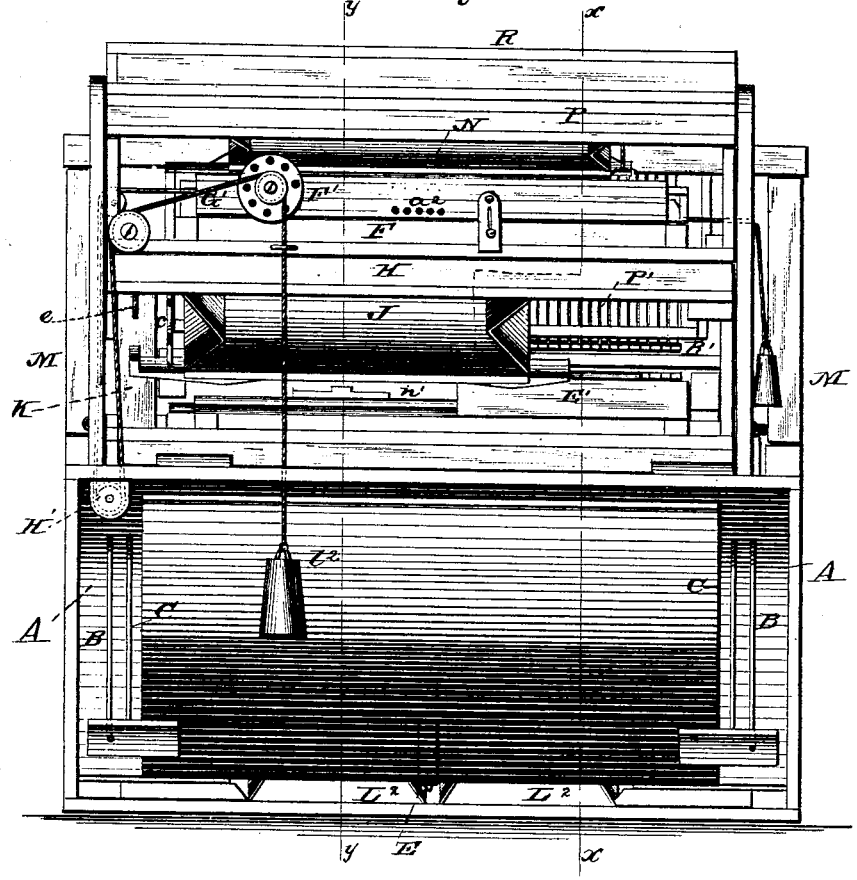
Figure 3:
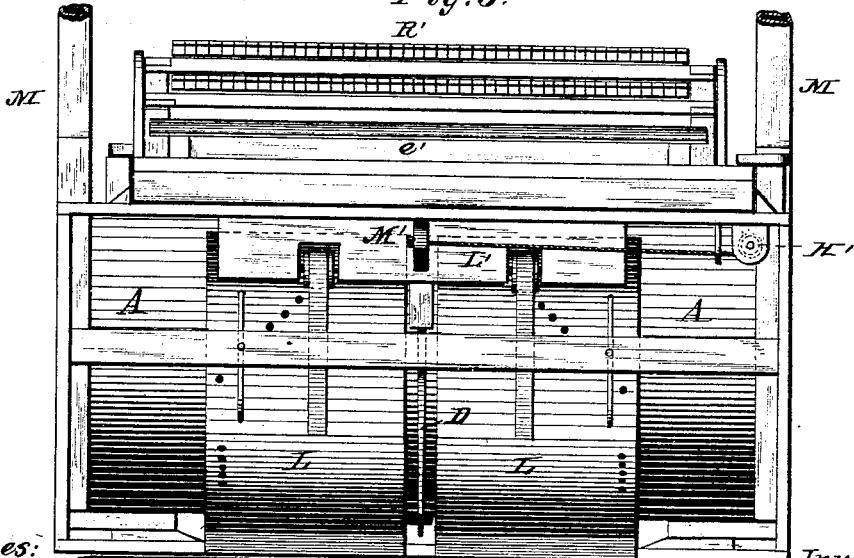
Figure 4:
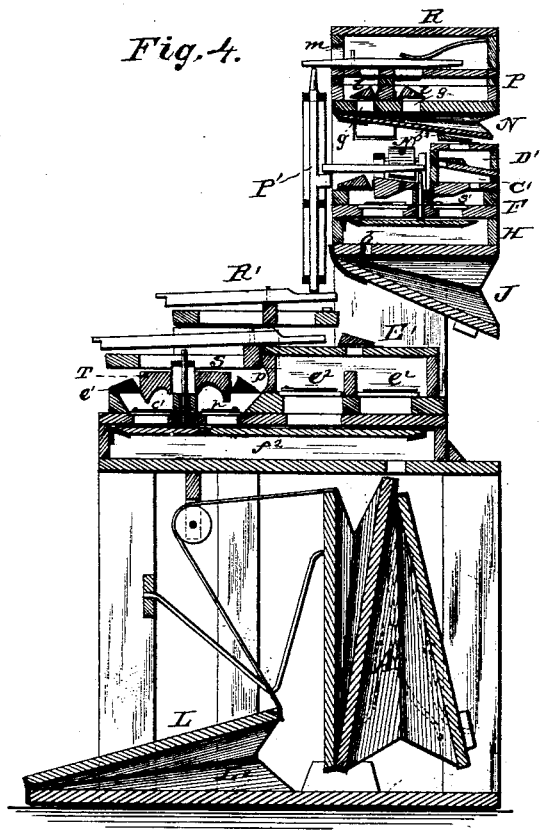
Figure 5:
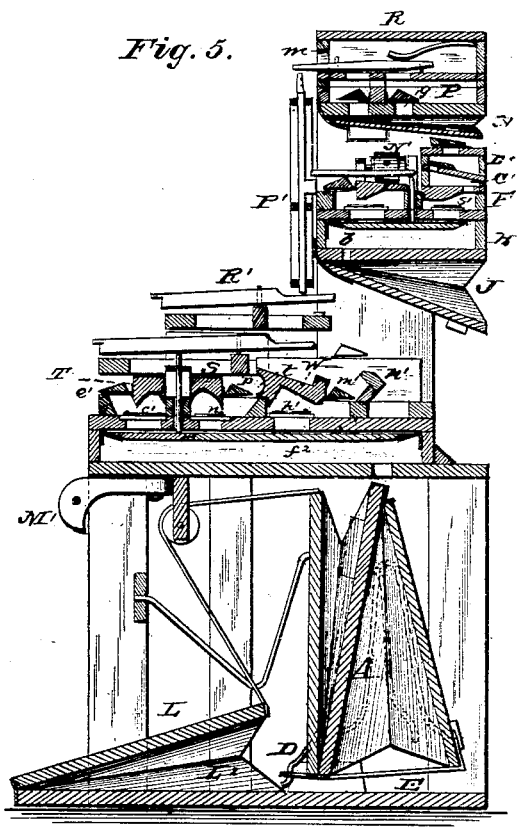
Figure 6:
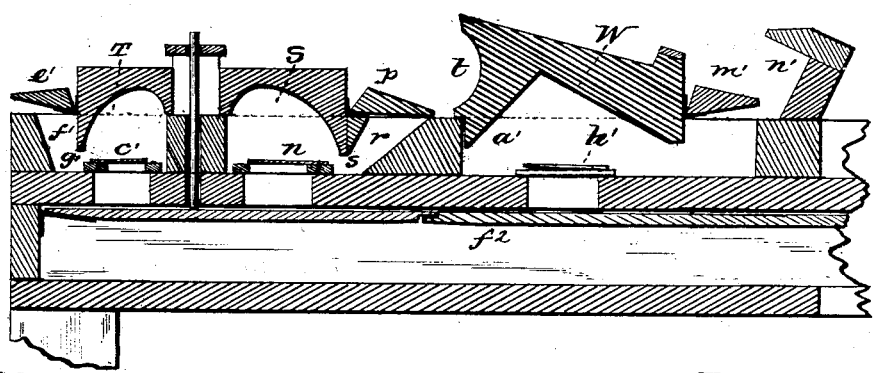
Figure 13:
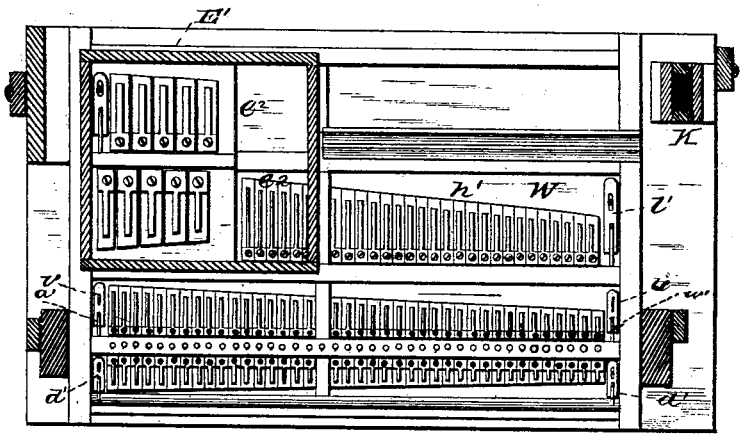
Figure 14:
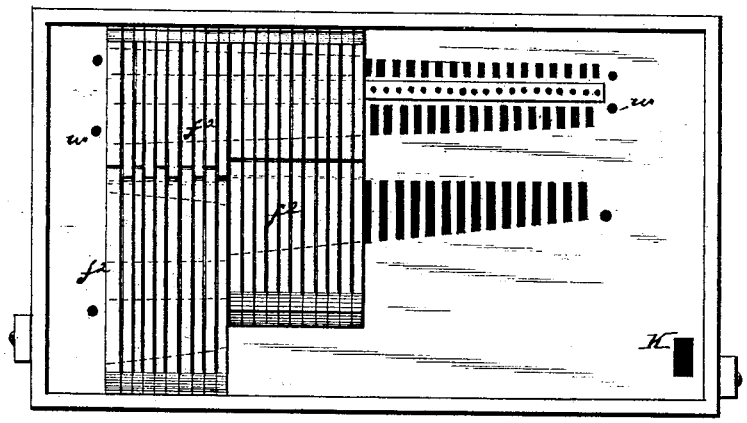
Figure 15:
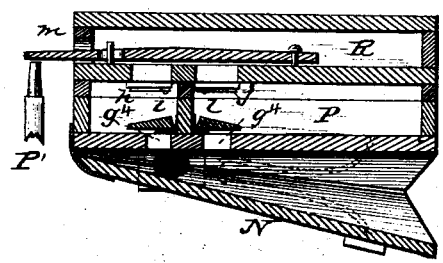
Figure 17:
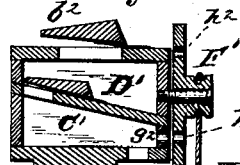
Figure 18:
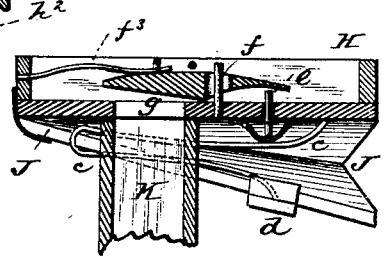
Figure 19:
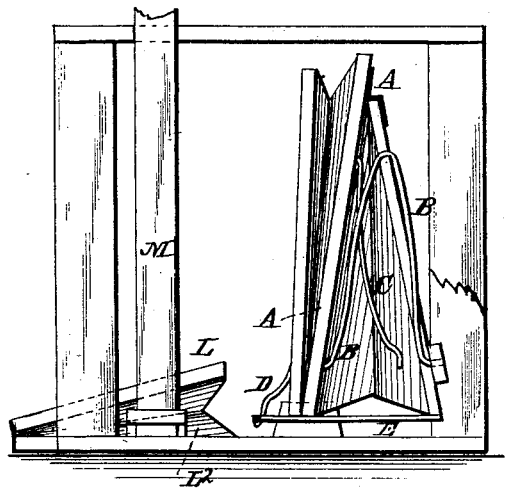
Figure 20:
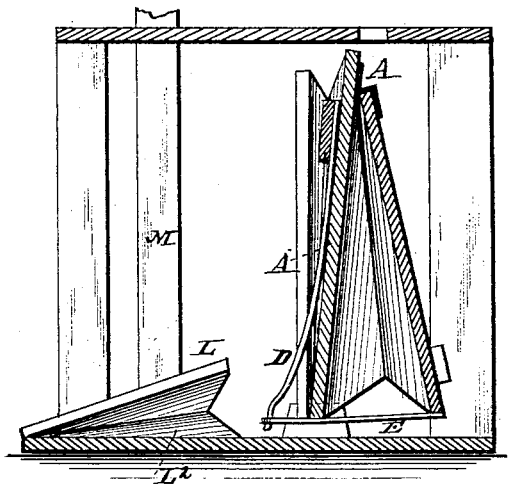
Figure 21:
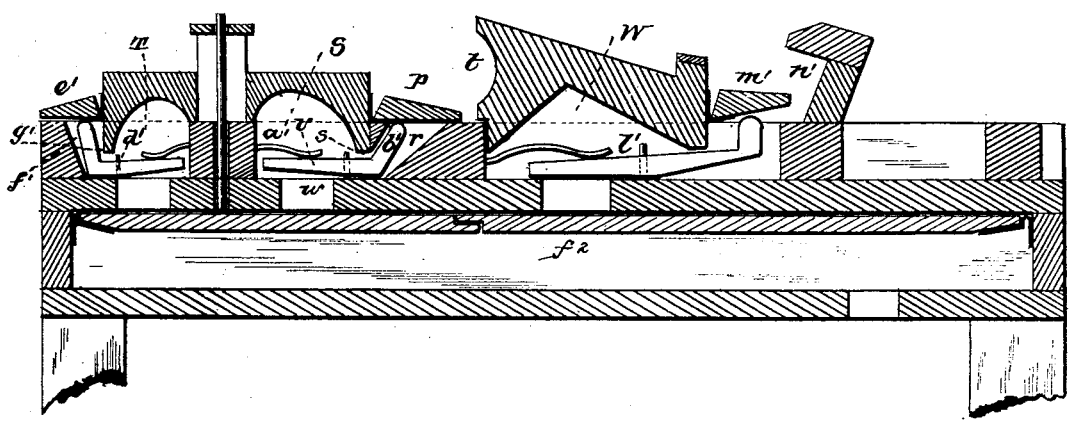

In the drawings, Figure 1 is a view, in front and end perspective, of the instrument. Fig. 2 is a view, in rear elevation, of the same. Fig. 3 is a detail view, in front elevation, of the lower portion of the instrument. Fig. 4 is a vertical transverse section through line $x$ $x$ of Fig. 2, looking toward the end of the instrument. Fig. 5 is a vertical transverse section through line $y$ $y$ of Fig. 2, looking toward the middle of the instrument. Fig. 6 is a detail view, in vertical transverse section, of the parts which produce the flute tone, the diapason tone, and the bugle tone. Fig. 7 is a detail longitudinal section of the diapason-tone chamber. Fig. 8 is a detail vertical transverse section of the parts which produce the cornet tone and the zephyr tone. Fig. 9 is a detail view of a reed-block employed for the zephyr-reeds, said view being in vertical transverse section through the reed-opening of the block. Fig. 10 is a detail view of the reed-block employed for the flute, diapason, and bugle reeds, said view being in vertical transverse section through the reed-opening. Fig. 11 is a detail view of the reed-block shown in the preceding figure, said view being in vertical longitudinal section through the reed-opening, and representing a reed in a state of rest. Fig. 11ª is a view similar to the preceding one, and representing a reed in its state of vibration, said reed being further represented as a low-note reed, having increased sectional dimension at its free end. Fig. 12 is a detail view, in vertical transverse section, of the chamber containing the sub-bass reeds, and also of that portion of the flute and diapason tone chambers which is in transverse line with the sub-bass chamber. Fig. 13 is a detail view, in horizontal section, of the several tone-chambers located on the lower wind-chest, and representing, in plan, the several sets of reeds inclosed in said chambers. Fig. 14 is a reverse plan view of the top of the lower wind-chest, constituting the reed-board for the several sets of reeds shown in the preceding figure. Fig. 15 is a detail vertical transverse section of the parts which produce the trumpet tone and the clarionet tone. Fig. 16 is a detail plan view of the cornet-tone chamber provided with the perforated strip. Fig. 17 is a detail view, in vertical transverse section, of the perforated disk and the wall to which it is connected. Fig. 18 is a detail view, in vertical transverse section, through the wind-chest below the zephyr and cornet chambers, showing its connection with the air-draft passage. Fig. 19 is a detail view, in end elevation, of the main bellows. Fig. 20 is a detail view, in vertical transverse section, of the main bellows, showing the check-spring in side elevation. Fig. 21 is a detail view, in vertical transverse section, of a tone-chamber and a wind-chest, representing the manner of operating an escapement-valve.

The exhaust-bellows A is provided, in addition to the usual main springs B, with two supplemental springs, C, adapted to be brought into operation after the main springs are partially compressed. The supplemental springs secure full dynamic effect to the tone of the instrument. They are secured at their upper extremities to the middle bellows-board, and their opposite free extremities are adapted to engage with the lower portion of the rear bellows-board. These springs prevent the bellows from being collapsed to such an extent as it otherwise would. Hence a more complete vacuum is caused, and thereby a maximum of draft is obtained, which imparts strength to the tone.

A check-spring, D, adapted to resist the tension of the main springs of the bellows, has its upper extremity secured to the central portion of the middle bellows-board, and its opposite extremity extends downwardly, in forward projection, to a point below the lower portion of said board. A flexible connecting device, E, has its opposite extremities respectively secured to the lower end of this spring and the lower central portion of the near board of the bellows.

The construction of parts is such that the check-spring is not brought into active operation until after the supplemental springs are released from active operation as the bellows fills with air. This spring D prevents the bellows from opening or expanding as rapidly and easily as it otherwise would when the bellows is filling with air, thereby producing a graduating decrease of the air-draft until it fades away entirely, causing a perfect vanish in such sounds of the instrument as are sufficiently delicate in the voicing to respond to that degree of air-draft.

Within a tone-chamber, F, is located a set of reeds, which are voiced down thin to produce the light reedy tones. Below this chamber is a wind-chest, H, which I call the "middle" wind-chest. A bellows, J, below this wind-chest, has communication with the latter by means of suitable openings $b$, springs $c$ tending to maintain the bellows open.

The lower or movable board of the bellows is provided with a tappet, $d$, adapted to engage with a pin, $e$, which depends from a valve, $f$, located within the wind-chest. This valve closes a valve-opening, $g$, Fig. 18, which connects the wind-chest with an air-draft passage, K, leading from said middle wind-chest to the lower wind-chest. By this construction, when the draft of air becomes too great for the safety of the light reeds, and the bellows J are necessarily collapsed by the air-vacuum in the middle wind-chest, then the lower board of said bellows closes valve $f$, and the draft ceases. As soon as the wind-chest is again filled with air the bellows J necessarily expand, and the lower board thereof releases valve $f$. The latter being held normally in open position by a spring, $f^3$, or other means communication between the middle and lower wind-chests is re-established.

The blow-pedals L constitute feeders for lower force-bellows, $L^2$, which latter respectively connect, by air-passages M, with an upper force-bellows, N. This latter bellows connects, by openings $g^4$, Fig. 15, with an upper wind-chest, P, said wind-chest being formed in two longitudinal compartments, the set of trumpet-reeds $h$ being located in the forward compartment and the set of clarionet-reeds $j$ being located in the rear compartment. Stop-valves $l$ govern said openings $g^4$. A valve-chamber, R, is provided with an air-egress opening, $m$, formed in its forward side.

I produce a diapason-pipe tone by the parts shown more plainly in Fig. 6 of the drawings. The tone-chamber S, in which the diapason-reeds are located, is preferably divided into two transverse sections, each of which is provided with a set of reeds, $n$. Stop-valves $p$ control the passage of air respectively into these chamber-sections. This diapason-tone chamber is formed in its transverse section much in the longitudinal outline of an egg. It gradually decreases in size from the point of the lowest-note reed to the point of the highest-note reed, this difference of size being necessary to permit the heavy or bass note reeds to be fully sounded, this construction being shown in Fig. 7 of the drawings.

The height of the chamber may vary with the force of the tone desired, a high chamber producing a note of greater power than a low chamber. That portion of the passage $r$ which directly connects with the tone-chamber is made of contracted dimension, as shown at $s$. The size of this contracted portion of the air-passage determines largely the character of the tones, as does also the longitudinal concave wall $t$, adapted to receive the impact of the air-vibrations as the latter issue from the passage.

Stop-valves $p$ being opened, and any of the diapason-reeds being sounded, their vibrations are thrown first against the curved roof of the tone-chamber. A peculiar tone is thereby caused, which is again affected by passage of the vibrations through the contracted portion $s$ of the air-passage. The tone thus far obtained is, thirdly and finally, acted upon by the vibrations coming in contact with the concave wall. The sound which issues from the instrument is thus produced by the three agencies acting in consecutive order, as described, a full pipe tone being the resultant.

Each section of the diapason-tone chamber is provided with escapement-valves $v$, governing openings $w$, which connect said chamber with the lower wind-chest, Fig. 21. These valves are adapted, by springs $a'$ or other suitable means, to normally remain in closed position. Tappets $b'$, projecting upwardly from the valve-stems, are adapted to be engaged by stop-valves $p$ as the latter are closed. The tappet extremities of the escapement-valve stems being thus depressed, their opposite extremities, which constitute the valves proper, are thereby raised, and air is permitted to escape from the tone-chamber into the wind-chest. These escapement-valves prevent the ciphering of the reeds when the corresponding stop-valve is closed.

In front of the diapason-tone chamber is located a chamber, T, in which are placed a set of reeds, $c'$, Fig. 6, which produce a flute tone. This chamber is preferably divided into two transverse sections, the same as is the diapason-tone chamber. The form of the flute-tone chamber is much similar in cross-section to that of the diapason-tone chamber. This flute-tone chamber gradually decreases in height from the point of its lowest to the point of its highest note reed, in order to provide for the lesser vibrations made by said higher notes, the construction in this respect being the same as was described and illustrated relative to the diapason-tone chamber.

Escapement-valves $d'$, Fig. 21, are located at the end of each section of the flute-tone chamber, and control the escape of air from the latter to the lower wind-chest. These escapement-valves are operated by engagement of the tappet extremities of their stems with the stop-valves $e'$, as the latter are closed, in the same manner as was previously described in reference to the escapement-valves in the diapason-tone chamber, and for the same reason—namely, to prevent ciphering of the reeds when the stop-valves are closed.

The passage $f'$, which supplies the flute-tone chamber with air, is formed with a contracted portion, $g'$, which is smaller than the contracted portion $s$ of passage $r$, connecting with the diapason-tone chamber.

The air being thrown into vibrations by the flute-reeds, said vibrations strike first against the peculiarly-curved roof of chamber T, thence pass out by the contracted portion $g'$, through passage $f'$, thereby producing a full flute tone.

It will be observed that the outer wall of passage $f'$ is beveled so as to incline upwardly and forwardly. Instead thereof it may be made longitudinally concave, if desired.

It will be observed that the tone-chambers S and T are respectively made so that their cross-section presents an arched or oval form. Heretofore reed-cells have been made arched or oval in their longitudinal section, each reed having its independent cell, which latter communicates directly with the open air, and the free ends of the reeds being located in line with the smallest vertical dimension of the cell. The improvements of my construction over such a reed-cell are several in number and prominent in distinction. Thus I form a tone-chamber which extends lengthwise and continuously over an entire set of reeds, said tone-chamber communicating with the open air by means of an independent passage which is of less sectional area than the tone-chamber, said independent passage being contracted in sectional area at that point thereof which connects with the tone-chamber, said tone-chamber having its greatest vertical dimension in line with the free ends of the reeds.

In rear of the diapason-tone chamber, and extending preferably only a portion of the length of the same, is located a chamber, W, Fig. 6, in which is a set of reeds, $h'$, which produce a bugle tone. This chamber in cross-section is formed similar to a triangle, and its height gradually decreases from its lowest to the highest reed. An escapement-valve, $l'$, is located in this chamber, Fig. 21, and permits escapement of air therefrom into the lower wind-chest when stop-valve $m'$ is closed, in the same manner and for the same reason as previously described for the diapason and flute tone chambers. When any of the set of reeds in this bugle-tone chamber are operated their vibrations come in contact with the oblique angle of the roof of said chamber, and the bugle tone is produced. As the vibrations issue from the chamber they strike against wall $n'$, formed longitudinally with an obtuse angle, the sound being thereby enlarged to fullness, and the full bugle character being obtained.

It will be observed that the construction of parts respectively forming the flute, diapason, and bugle tones are similar in the following feature, which constitutes a prominent element in the production of said tones: The tone-chambers do not directly connect with the open air by means of their stop-valves; but, on the contrary, said chambers connect with passages, which latter communicate with the external air when the stop-valves connected with said passages are open. This feature of construction causes the air to travel some distance after admission into the instrument before coming in contact with the reeds. It also causes the vibrations produced by the reeds to travel some distance after their formation before issuing from the instrument. The contracted portions of the air-passages, which directly connect with the tone-chambers, serve to compress the air just before entering the latter. They also cause the air to rush into said tone-chambers rapidly. The desired tones are thus produced with remarkable accuracy and clearness.

To make a cornet tone I form a chamber, A′, Fig. 8, of the transverse section represented. The roof of this chamber is as follows: Its forward portion inclines diagonally upward and rearward, while its rear portion is horizontal, thus making the rear portion of the chamber of greatest height. The forward portion of the chamber communicates, by intermediate passage $a^6$, with air-supply passage $a^7$, which latter is provided with stop-valve $r'$. This cornet-tone chamber preferably decreases slightly in size from its lowest to its highest note reed, and is provided with a suitable valve for the escapement of air therefrom to the middle wind-chest when stop-valve $r'$ is closed. The operation and result of this escapement-valve are similar to those previously described for the flute, diapason, and bugle tone chambers. The air being drawn into this cornet-tone chamber with a light suction, the reeds $a^3$ are thrown into delicate vibrations, which latter strike against the peculiarly-shaped roof, and the cornet tone is produced.

In chamber F, Fig. 8, in rear of the cornet-tone chamber, is placed a set of reeds, $s'$, which produce the zephyr tone, said reeds being small, thin, and susceptible of vibration from the lightest breath of air. These reeds are guarded from breaking by the automatic valve $f$, Fig. 18, previously described, for cutting off the exhaust from the middle wind-chest into the lower wind-chest.

The chamber is made of very slight height at that forward portion thereof in which the reeds are directly located, so that the reeds barely have room in which to make their vibrations.

The rear longitudinal portion of the chamber is made of greater height than the forward portion, and it connects with a compartment, C', located above the chamber F. Said compartment extends over the length and width of the said tone-chamber, and at its longitudinal portion, opposite to that which connects with the tone chamber, its top is provided with a valve-opening, $t'$. This opening is provided with a stop-valve, $w'$, which controls the passage of air from a compartment, D', located above compartment C', and extending over the length and width thereof.

The rear wall of the lower compartment is provided with a series of small holes, $a^2$, which constantly admit external air therein.

A swell-valve, $b^2$, controls an opening formed in the top of the upper compartment, and permits, when open, an inrush of air into said compartment. This added quantity of air necessarily results in increasing the zephyr tone proportionately to the distance which the swell-valve is opened.

The air which is admitted into said upper compartment passes into the lower compartment at one longitudinal portion thereof, and from its opposite longitudinal portion into the tone-chamber. The sound being thus conducted by a circuitous course from the zephyr-reeds before issuing from the instrument, the vibrations of the reeds are given a faintness, in imitation of a tone coming from a distance.

As shown in Fig. 9 of the drawings, the reed-block to which the zephyr-reeds are attached has square reed-openings $c^2$. This construction is in contradistinction to reed-blocks which have their reed-openings made laterally flaring from their upper to their lower portions. These square openings prevent the passage of any air through them which does not act upon the reeds and cause the latter to vibrate proportionately to the strength of the air-current of such air-passage. Hence the small quantity of air admitted into the zephyr-tone chamber through holes $a^2$ necessarily operates upon the reeds and causes them to slightly vibrate.

In Figs. 10 and 11 is represented the form of reed employed for the flute, diapason, and bugle tones, said reeds being gradually tapering in thickness from their stems to their free extremities in the reeds of highest note, while the reeds of lowest note are gradually tapered from their stems to a point near their free extremities, which latter are enlarged in order to have weight sufficient for the depression of the pitch in tuning said reeds.

The reeds which produce notes intermediate of the lowest and highest notes are formed in graduated construction between the two extremes herein mentioned, said reeds of intermediate notes being made gradually heavier at their free extremities, as they are located farther from reeds of highest note and nearer reeds of lowest note. These reeds are thereby adapted to vibrate in curved form and to bend throughout the greater portion of their length. The openings in the reed-blocks are made of smallest dimension at about their vertical longitudinal central portion, above and below which point they flare laterally outward, so that suction force may be obtained in vibrating the reeds.

I do not herein claim this construction of reed-block, as it forms the subject-matter of another application of mine.

The reeds are fitted in longitudinal horizontal inclination within these openings, extending downward from their stems to their free extremities. The air is thereby drawn into said openings, and comes in suction-contact with the reeds, thus vibrating the latter, so as to produce a proportionately strong tone. These reeds are made broader and longer than the ordinary reeds in order to expose sufficient surface for the air-draft to act on, and thereby enlarge the tone.

It will be understood that any suitable form of reed may be employed in this instrument in substitution for the particular reeds above described.

The height of the tone-chambers is the main cause producing the force and depth of the tone which issues from them. This height of chamber is necessarily limited by the pitch of tone in the set of reeds connected with said chamber, said height gradually decreasing from the lowest to the highest note-reeds. I provide a chamber, E, Fig. 12, located over the rear left-hand portion of the lower wind-chest, within which is placed a set of sub-bass reeds, $e^2$. These reeds extend downward from swell F through the sub-bass register on the double-diapason pitch, or one octave below the diapason. This set of reeds meets the bugle set of reeds, which latter is voiced one octave below the diapason, resulting in a connected sub-bass register without breakage in the scale. A portion of the reeds in the sub-bass chamber are formed in double row, substantially as shown in Fig. 13 of the drawings, the consecutive note-reeds being alternated in position in said two rows.

The reed-valves $f^2$ extend across the entire width of the lower wind-chest, and are each made in two transverse sections, said sections being suitably jointed together at their meeting extremities. These valves permit the different sets of reeds to be readily vibrated by means of a single key and tracker. Those valves which operate the double row of sub-bass reeds are formed with the junction-point of their sections forward or backward according as the valve operates the front or rear row.

This permits the rear sections of the valves which operate the rear row of sub-bass reeds to have a lower movement beneath said reeds than would be the case if the reed-sections were united as far forward as are the sections of the valves which operate the front row of sub-bass reeds. Such construction, however, does not entirely compensate for the difference in position of the two rows of sub-bass reeds. Hence the valve-openings of the rear row of reeds are made longer than the valve-openings of the front row of reeds, as shown at $e^3$ in Fig. 12, in order to make full compensation.

The means employed to form a very effective trill and warble of the softer tones are as follows: The compartment C', which is located immediately over the zephyr-tone chamber, has its rear wall provided with one or more holes, $g^2$, Fig. 17. A pivotal disk, F', is provided with holes $h^2$, adapted to register, during the rotation of the disk, with holes $g^2$. A cord, G', fits in a pulley formed rigid with said disk, and one extremity of said cord is provided with a weight, $l^2$, Fig. 2, while the other extremity of the cord is wound around a rotary shaft, H', extending transversely beneath the bed of the instrument. A second cord, L', has one extremity wound about said rotary shaft and its opposite extremity connected with a knee-lever, M', Fig. 1. The top of the cornet-chamber A' is provided with a series of holes, $m^2$, Fig. 8, adapted to register with holes $n^2$, formed in a strip, N', of parchment or other suitable material, one extremity of the strip being secured to a roller, $p^2$, which is actuated in movement to wind the strip thereon by a weighted cord, $r^2$, or by other suitable means. The opposite extremity of the strip is attached to a cord, $s^2$, which connects with rotary shaft H', Fig. 1.

By operating the knee-lever both the perforated strip and the perforated disk are moved so as to produce a trill. By moving the knee-lever at different rates of speed a very pleasing warbling tone is produced, which closely imitates the human voice. It is not necessary that both the disk and strip be simultaneously used.

The reed-valves connected with the cornet and zephyr sets of reeds are operated in the same manner that the reed-valves connected with the clarionet and trumpet reeds are operated.

Upright trackers P', Figs. 4 and 5, have their lower extremities engaged with an upper row of keys, R', while their middle and upper portions engage with the forwardly-projecting ends of said reed-valves.

In the foregoing specification I have described in detail the construction of the instrument shown in the drawings. I desire it to be understood, however, that the principle of the invention is merely illustrated by said description and drawings. Changes in the arrangement or location of parts may be made, and omissions or substitutions of elements may be effected, provided the essential features of invention set forth in the following claims are employed.

Having fully described my invention, what I claim as new, and desire to secure by Letters Patent, is—

1. In a musical reed-instrument, the combination, with an exhaust-bellows provided with main springs, of a supplemental spring or springs adapted to be brought into operation after the main springs have been partially compressed, substantially as set forth.

2. In a musical reed-instrument, the combination, with an exhaust-bellows provided with main springs, of a supplemental spring or springs having their upper extremities secured to the stationary bellows-board and their opposite extremities adapted to have free lateral bearing against the lower portion of the movable bellows-board, substantially as set forth.

3. In a musical reed-instrument, the combination, with an exhaust-bellows provided with main springs, of a check-spring connected with the movable bellows-board and adapted to resist the tendency of said main springs to press the movable bellows-board outwardly, substantially as set forth.

4. In a musical reed-instrument, the combination, with an exhaust-bellows provided with main springs, of a check-spring having its upper extremity connected to the stationary bellows-board and its opposite extremity attached by a flexible connecting device to the lower portion of the movable bellows-board, substantially as described.

5. In a musical reed-instrument, the combination, with an exhaust-bellows provided with main springs and a supplemental spring or springs, of a check-spring connected with the movable bellows-board and adapted to operate in resisting the tendency of the main springs to press the said bellows-board outwardly after the supplemental spring or springs have ceased to operate, substantially as set forth.

6. In a musical reed-instrument, the combination, with a reed-chamber provided with a perforated wall, of a perforated registering-disk and a cord or band passing over a pulley formed rigid with the disk, and means for moving said cord or band, substantially as set forth.

7. In a musical reed-instrument, the combination, with a reed-chamber provided with a perforated wall and a perforated registering-disk, of a cord passing over a pulley formed rigid with the disk, one extremity of said cord being weighted and the opposite extremity being wound about a rotary shaft, substantially as set forth.

8. In a musical reed-instrument, the combination, with two reed-chambers inclosing sets of different tone reeds, and tremolo devices attached to said chambers, of a knee-lever and means which connect the latter to said tremolo devices, substantially as set forth.

9. In a musical reed-instrument, the combination, with two reed-chambers respectively provided with tremolo devices and a rotary shaft, of flexible connections which extend from said tremolo devices to the shaft, and a flexible connection extending from the knee-lever to the same shaft, substantially as set forth.

10. In a musical reed-instrument, the combination, with a set of reeds and a tone-chamber in which the reeds vibrate, of an independent air-passage formed of less sectional area than the tone-chamber and communicating with its opening, and a stop-valve governing the outer opening of said air-passage, substantially as set forth.

11. In a musical reed-instrument, the combination, with a set of reeds and a tone-chamber in which the reeds vibrate, of an independent air-passage formed of less sectional area than the tone-chamber and communicating with its opening, and a stop-valve governing the outer opening of the passage, said passage inclining diagonally upward from its point of connection with the tone-chamber, substantially as set forth.

12. In a musical reed-instrument, the combination, with a set of reeds and a tone-chamber in which the reeds vibrate, of an independent air-passage formed of less sectional area than the tone-chamber and communicating with its opening, and a stop-valve governing the outer opening of the passage, said passage at its point of connection with the tone-chamber being formed of smaller size than at other points, substantially as described.

13. In a musical reed-instrument, the combination, with a set of reeds and a tone-chamber in which they vibrate, of an independent air-passage formed of less sectional area than the tone-chamber and communicating with its opening, and a stop-valve governing the outer opening of the air-passage, said passage being of smallest area at its point of connection with the tone-chamber, and extending diagonally upward therefrom, substantially as set forth.

14. In a musical reed-instrument, the combination, with a set of reeds and a tone-chamber in which the reeds vibrate, of an independent air-passage formed of less sectional area than the tone-chamber and communicating with its opening, and a stop-valve governing the outer opening of the air-passage, said reeds having their stems secured to that portion of the tone-chamber nearest its connection with the air-passage, and having their free extremities located in that portion of the chamber which is of greatest height, substantially as described.

15. In a musical reed-instrument, the combination, with a set of reeds, of a tone-chamber having its cross-section similar to the longitudinal outline of an egg, the free extremities of the reeds being located in line with the greatest vertical dimension of the chamber, and their stems being secured in that portion of the chamber having contracted vertical dimension, substantially as set forth.

16. In a musical reed-instrument, the combination, with a set of reeds and a wind-chest, of a tone-chamber having a form the cross-section of which resembles the longitudinal outline of an egg, and an air-passage the front wall of which inclines upwardly and forwardly from the connection of said passage and chamber, substantially as set forth.

17. In a musical reed-instrument, the combination, with a set of reeds, a wind-chest, and a tone-chamber having a form the cross-section of which resembles the longitudinal outline of an egg, of a passage which connects the chamber with the open air and a sounding-wall adapted to receive the air-vibrations which issue from the passage, said wall being formed longitudinally concave, substantially as set forth.

18. In a musical reed-instrument, the combination, with a set of reeds and a wind-chest, of a tone-chamber having a form substantially as shown, the cross-section of which is practically triangular, and a passage which connects said chamber with the open air, substantially as set forth.

19. In a musical reed-instrument, the combination, with a set of reeds, a wind-chest, and a tone-chamber the cross-section of which is substantially triangular, of a passage connecting the chamber with the open air and a sounding-wall adapted to receive the impact of the air-vibrations from the passage, said wall being formed with upper and lower longitudinal portions, inclined relatively to each other, substantially as set forth.

20. In a musical reed-instrument, the combination, with a set of reeds, a wind-chest, and a tone-chamber the cross-section of which is substantially triangular, of a passage connecting the chamber with the open air and a sounding-wall against which the air-vibrations from the passage have impact, said wall being formed with upper and lower longitudinal portions, the lower portion inclining from the air-passage, while the upper portion is of less width than the lower portion and inclines in an opposite direction, substantially as set forth.

21. In a musical reed-instrument, the combination, with a set of reeds which extend downward from swell F through the sub-bass register on the double-diapason pitch, of a set of bugle-reeds, which also are voiced to a double-diapason pitch, said sets of reeds being respectively located in different transverse portions of the instrument, substantially as set forth.

22. In a musical reed-instrument, the combination, with a set of reeds, of a tone-chamber having the forward portion of its roof inclining diagonally upward and rearward and the rear portion thereof formed horizontal, substantially as set forth.

23. In a musical reed-instrument, the combination, with a set of reeds and a tone-chamber having the forward portion of its roof inclining diagonally upward and rearward, of an air-passage provided with a stop-valve and communicating by a smaller intermediate passage with the forward portion of the tone-chamber, substantially as set forth.

24. In a musical reed-instrument, the combination, with a set of reeds and a tone-chamber, of one or more air-compartments located in order above the tone-chamber and provided with air-connections, said tone-chamber being formed closed, with the exception of its reed-opening and its air-opening into the chamber above, substantially as described.

25. In a musical reed-instrument, the combination, with a set of reeds and a tone-chamber, of two air-compartments located in order above the tone-chamber and having alternate end-connecting openings, substantially as set forth.

26. In a musical reed-instrument, the combination, with a set of reeds and a tone-chamber, of two air-compartments located in order above the tone-chamber, said two compartments being adapted to have independent communication with the open air, substantially as set forth.

27. In a musical reed-instrument, the combination, with a set of reeds, a wind-chest, and a tone-chamber, of one or more air-compartments located in order above the tone-chamber and having alternate end-connecting passages, the upper chamber being provided with one or more small passages communicating constantly with the open air, substantially as set forth.

28. In a musical reed-instrument, the combination, with a front and a rear row of reeds located in the same transverse plane, of a set of reed-valves respectively formed in two transverse sections, the junction-points of the sections of the several valves being formed forward or back of a given line, accordingly as each valve operates a reed of a front or rear row of reeds, substantially as and for the purpose set forth.

29. In a musical reed-instrument, the combination, with two longitudinal rows of sub-bass reeds, the reeds in one row being respectively located opposite the interspaces of the reeds in the other row, of a set of reed-valves, each formed in two transverse sections, the junction-point of the sections of the different valves alternating with each other forward and backward of an intermediate line, substantially as set forth.

30. In a musical reed-instrument, the combination, with a front and a rear row of reeds located in the same transverse plane, of a set of transversely sectional reed-valves, said rear row of reeds having their valve-openings formed longer than the valve-openings of the front row of reeds, substantially as set forth.

31. In a musical reed-instrument, the combination, with a wind-chest and an air-passage, of a valve governing the latter and a bellows communicating with the wind-chest and adapted to automatically close said valve, substantially as set forth.

32. In a musical reed-instrument, the combination, with a wind-chest, an air-passage connecting therewith, and a valve controlling the passage, of a bellows communicating with the wind-chest, a tappet formed on the movable board of the bellows, and a pin which is operated by said tappet to close the valve, substantially as set forth.

33. In a musical reed-instrument, the combination, with a wind-chest, air-passage connecting therewith, and a valve governing the passage, of a bellows communicating with the wind-chest, a spring which tends to maintain the bellows open, and a sliding pin adapted to be operated by the movable bellows-board to close the valve, substantially as set forth.

34. In a musical reed-instrument, the combination, with a wind-chest, an air-passage connecting therewith, a valve governing the passage, and a spring tending to maintain the valve open, of a bellows communicating with the wind-chest, a spring tending to maintain the bellows open, a sliding pin, and a tappet formed on the movable bellows-board, substantially as set forth.

In testimony that I claim the foregoing I have hereunto set my hand and seal, 23d day of January, 1880.

MOSES O. NICHOLS. [L. S.]

Witnesses:
 J. H. RHODES,
 E. L. MUNDY.